F. MISKOVSKY.
AUTOMOBILE STARTING DEVICE.
APPLICATION FILED JUNE 24, 1911.
1,047,103.
Patented Dec. 10, 1912.
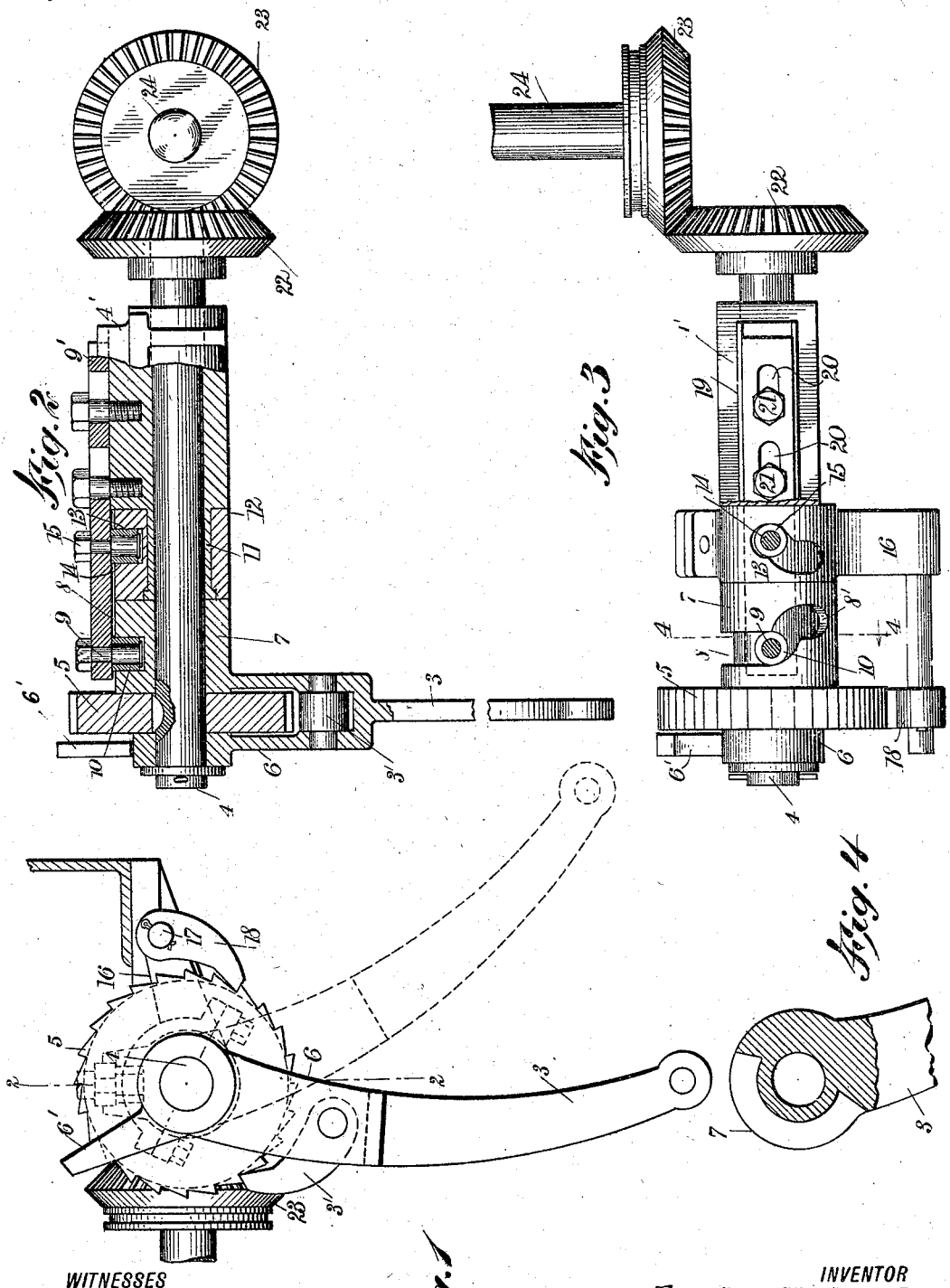
WITNESSES
INVENTOR
Frank Miskovsky
BY
ATTORNEYS

UNITED STATES PATENT OFFICE.

FRANK MISKOVSKY, OF PROVIDENCE, RHODE ISLAND.

AUTOMOBILE STARTING DEVICE.

1,047,103.  Specification of Letters Patent.  Patented Dec. 10, 1912.

Application filed June 24, 1911. Serial No. 635,100.

*To all whom it may concern:*

Be it known that I, FRANK MISKOVSKY, a subject of the Emperor of Austria-Hungary, and a resident of Providence, in the county of Providence and State of Rhode Island, have invented a new and Improved Automobile Starting Device, of which the following is a full, clear, and exact description.

My invention is a starting device for automobiles, by means of which the engine can be conveniently started from the operator's seat; and it includes certain novel features of construction which are designed to minimize the liability of accident to the operator in case of backfiring, or the starting of the engine in the wrong direction.

Reference is to be had to the accompanying drawings forming a part of this specification, in which the same characters of reference indicate the same parts in all the views.

Figure 1 is a side elevation of my improved starting mechanism; Fig. 2 is a vertical section thereof taken on the line 2—2 of Fig. 1, the gears for connecting the starting shaft with the crank shaft of the engine, and part of the engine frame, being shown in elevation; Fig. 3 is a top plan of the construction shown on Fig. 2; and Fig. 4 is a vertical section of the operating lever only, taken on the line 4—4 of Fig. 3, looking in the direction of the arrow.

On the drawings, 3 is a lever having a yoke 6 at its upper end, the arms of which are loosely mounted on a starting shaft 4. This shaft 4 is mounted in a bearing 4' connected to the frame or chassis of the vehicle, and on its outer end, preferably between the arms of the yoke at the upper end of the lever 3, is keyed, so as to rotate with the shaft 4, a ratchet wheel 5. 3' is a pawl carried by the lever 3 to engage the ratchet 5 to transmit motion thereto and to the shaft 4, when it is desired to put the vehicle in motion.

From the face of the arm of the yoke of the lever 3 which is farthest from the adjacent end of the shaft 4, projects a boss or hub 7. This boss or hub 7 is preferably formed integral with the yoke and the lever 3, and projects laterally therefrom a suitable distance. This hub or boss is cylindrical in form, having a bore to permit the shaft 4 to pass therethrough. In the outside of this boss is formed a groove 8, this groove 8 being straight for a portion of its length, lying in a plane parallel to the plane of the ratchet wheel 5, and then communicates with a parallel portion 8' which lies in a transverse plane a slight distance removed from the transverse plane of the groove 8. 9 is a bolt fixed in a plate 9' slidably mounted in the top of the bearing or support 4', and having a roller 10 on its inner end, which projects into the groove 8 and is designed to have relative motion therein.

The bearing 4' has a projection 11 concentric with the bore of the shaft 4, extending outward from the end adjacent the end of the shaft 4 on which the lever 3 is mounted. This boss or projection 11 serves as a bearing for a cam 12, which has a groove 13 in its upper surface, this groove having the form shown on Fig. 3, that is, it is bent from the extremity which appears as the lower extremity on Fig. 3, to the right, instead of to the left, after the manner of the groove 8. Within this groove 13 moves a roller 14, which is mounted on a bolt 15 fixed to the slidable plate 9'. This cam 12 has a laterally projecting arm 16, in the outer end of which is mounted a pin 17, this pin being parallel to the shaft 4, and carrying on its outer end, in the plane of the ratchet 5, a pawl 18 to engage the ratchet in the manner shown on Fig. 2.

The sliding plate 9' moves between guides 19 on the top of the bearing member 4', and has slots 20, through which pass locking bolts 21. These slots permit the slide 9' to move back and forth over a distance equal to the length of these slots to prevent the plate 9' from becoming separated from the top of the bearing 4'. The shaft 4 bears a miter gear 22 on its end opposite the lever 3, this miter gear 22 meshing with a miter gear 23 on the engine crank shaft 24.

To start the engine, the lever 3 is pulled by hand in a counter clockwise direction, suitable links being connected to this lever. This will reciprocate the lever 3 to the left on Fig. 1, to transmit motion to the ratchet 5 through the pawl 3', to cause the ratchet to move in a clockwise direction. This movement of the lever 3, the ratchet 5 and the boss 7 will cause the starting shaft 4 to move to the right, through the engagement of the groove 8 with the roller 10 on the bolt 9, the parts, when the engine starts, being in the position shown on Fig. 2. This endwise reciprocation of the starting shaft 4 to the right will throw the miter gears 22 and 23 into mesh with each other. The further movement of the lever 3 will rotate the starting shaft 4, by means of the ratchet 5, and turn the crank shaft 24. As soon as the engine starts up the ratchet 5 will slip around past the pawl 3', and the lever 3 can then be pushed back to its original position, and the bolt 9 engaging the groove 8 as the boss 7 rotates in the opposite direction, will move back the starting shaft to throw the gears 22 and 23 out of engagement. This will allow the engine to run free and the starting mechanism to stand idle. Normally, the ratchet 5 will slip past the pawl 18; but should the engine backfire, causing the ratchet 5 to rotate in an anti-clockwise direction, referring to Fig. 2, it will engage the pawl 18 and carry with it this pawl and the arm 16. The result will be that the cam 12 will be rotated in such a way that the groove 13 will act upon the bolt 15 to move the sliding plate 9' to the left. This sliding plate when it moves to the left will push against the sides of the groove 8 by means of the bolt 9, and move the lever 3 and the ratchet 5 with it, separating the gears 22 and 23. This will prevent injury to the operator in case the engine should start in the wrong direction.

In order to return the sliding plate to its original position, with the bolts 21 occupying the left ends of the slots 20, the lever 3 is pulled to the left until a projection 6' on the upper end engages the pin 17 on the cam 16. This will throw down the arm 16 projecting laterally from the cam 12, and rotate the cam with it, so that the slot or groove 13 will so move with respect to the pin 15 as to cause this pin to return to the extremity of this slot, which appears as the upper extremity on Fig. 3. This action will move the sliding plate 9' to the right, as required, and the operation of starting can then be begun anew, until the engine starts in the right direction.

Having thus described my invention, I claim as new and desire to secure by Letters Patent:

1. In a starting device for automobile engines and the like, the combination of a starting shaft, means for transmitting motion therefrom to the crank shaft of the engine, means for transmitting rotary motion to said starting shaft, normally stationary means engaging the second-named means to move said starting shaft to put the same into operative relation with the crank shaft when the second-named means is operated, and means connected to said normally-stationary means and adapted to be actuated in case the engine starts in the wrong direction, to move said normally stationary means and shift the starting shaft to its original position to throw it out of engaging relation with the crank shaft.

2. In a starting device for automobile engines and the like, the combination of a starting shaft, means for connecting said starting shaft to the engine crank shaft, means loosely mounted upon said starting shaft and having means for engaging means on the starting shaft to rotate the same, normally stationary means engaging said loosely-mounted means on the starting shaft and serving to shift the starting shaft when the same is rotated, to put it into engaging relation with the crank shaft, and means surrounding said starting shaft and adapted to be actuated from the starting shaft in case the engine starts running in the wrong direction, said means being connected to said normally stationary means and moving the same to throw the starting shaft back to its original position, so as to disengage the same from the engine crank shaft.

3. In a starting device for automobile engines and the like, the combination of a starting shaft, means for transmitting motion therefrom to the crank shaft of the engine, a lever loosely mounted on the end of said shaft and having means for engaging the shaft to rotate the same, a boss projecting from said lever, a cam groove in said boss, normally stationary means entering said groove, whereby, when the lever is actuated to rotate the starting shaft, the starting shaft will be moved into engaging relation with the crank shaft, a second cam having a groove therein loosely mounted with respect to said starting shaft, means connected to the means entering the groove of the first cam, to enter the groove in said second cam, and means carried by said second cam and projecting into operative relation to said starting shaft to be engaged if the engine should start in a reverse direction, whereby, in case of back-firing, the second cam will be operated to transmit motion to the first cam and move the starting shaft out of transmitting relation with the crank shaft.

4. In a starting device for automobile engines and the like, the combination of a starting shaft, means for transmitting motion therefrom to the crank shaft of the engine, means for transmitting rotary motion to said starting shaft, normally stationary means engaging the second-named means to move said starting shaft endwise to put the same into operative relation with the crank shaft when the second named means is operated, and means connected to said normally stationary means and adapted to be actuated in case the engine starts in the wrong direction, to move said normally stationary means and shift the starting shaft endwise to its original position to throw it out of engaging relation with the crank shaft.

5. In a starting device for automobile engines and the like, the combination of a starting shaft, means for connecting said starting shaft to the engine crank shaft, means loosely mounted upon said starting shaft and having means for engaging means on the starting shaft to rotate the same, normally stationary means engaging said loosely-mounted means on the starting shaft and serving to shift the starting shaft endwise when the same is rotated, to put it into engaging relation with the crank shaft, and means surrounding said starting shaft and adapted to be actuated from the starting shaft in case the engine starts running in the wrong direction, said means being connected to said normally stationary means and moving the same to throw the starting shaft back to its original position, so as to disengage the same from the engine crank shaft.

6. In a starting device for automobile engines and the like, the combination of a starting shaft mounted to have endwise and rotary movement, a gear wheel on one end of said starting shaft to engage a gear wheel on the end of the crank shaft, a lever loosely mounted on the other end of said crank shaft, said lever having means for engaging means on the said end of the starting shaft to rotate the same, a boss projecting from said lever, a cam groove in said boss, a bolt carried by a normally stationary plate entering said groove, whereby, when the lever is actuated to rotate the starting shaft, the cam groove engaging the bolt will cause the lever to move the starting shaft to put the same into engaging relation with the crank shaft, a cam surrounding said starting shaft and out of engagement therewith, said cam also having a cam slot therein, a bolt carried by said normally stationary plate entering said cam slot, and a pin projecting from said cam parallel with said starting shaft and having a pawl thereon to engage the means for transmitting rotary motion to the starting shaft from the starting lever, said pawl being operated upon reverse rotation of the engine shaft to move said cam and reciprocate the normally stationary plate away from the engine shaft so as to move the starting shaft out of engaging relation therewith.

7. In a starting device for automobile engines and the like, the combination of a starting shaft, a normally stationary plate adjacent said starting shaft, said plate having a bolt projecting from one surface toward said shaft, a ratchet wheel carried upon said shaft, a yoke-shaped lever having its arms rotatably mounted upon said starting shaft and having a pawl to engage said ratchet to rotate the starting shaft, a hub or boss projecting laterally from one of the arms of said yoke-shaped lever, said hub or boss having a curved cam slot therein to receive the end of the bolt projecting from said plate, whereby, when the lever is moved to rotate the starting shaft, the bolt in the said cam slot will cause said shaft to move endwise into operative relation with the crank shaft.

8. In a starting device for automobile engines and the like, the combination of a starting shaft, a bearing therefor, said bearing having a boss projecting from one end thereof concentric with said shaft, a cam mounted upon said bearing, a curved slot in said cam, a plate slidably mounted with respect to said bearing and having a bolt projecting from one face into said curved slot, and means for engaging said cam upon the reverse rotation of the starting shaft to reciprocate said plate endwise, said plate when shifted, throwing the said shaft out of engaging relation with the crank shaft of the engine.

9. In a starting device for automobile engines and the like, the combination of a starting shaft, means for transmitting motion therefrom to the crank shaft of the engine, means for imparting motion to said starting shaft, means for engaging the motion-imparting means to move the starting shaft to put the same into operative relation with the crank shaft when the motion-imparting means is operated, and means adapted to be actuated in case the engine starts in the wrong direction, to move said engaging means and shift the starting shaft to its original position to throw it out of engaging relation with the crank shaft.

10. In a starting device for automobile engines and the like, the combination of a starting shaft, means for transmitting motion therefrom to the crank shaft of the engine, means for imparting motion to the said starting shaft, means for engaging the motion-imparting means to move the starting shaft to put the same into operative relation with the crank shaft when the motion-imparting means is operated, and means connected to said engaging means and adapted to be actuated in case the engine starts in the wrong direction, to move said engaging means and shift the starting shaft to its original position to throw it out of engaging relation to the chank shaft.

In testimony whereof I have signed my name to this specification in the presence of two subscribing witnesses.

FRANK MISKOVSKY.

Witnesses:
Thomas W. Gilchrist,
John M. Clifford.